United States Patent
Waltho

(10) Patent No.: US 7,430,252 B2
(45) Date of Patent: Sep. 30, 2008

(54) APPARATUS AND METHOD FOR WGIO PHASE MODULATION

(75) Inventor: Alan E Waltho, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1116 days.

(21) Appl. No.: 10/238,154

(22) Filed: Sep. 10, 2002

(65) Prior Publication Data

US 2004/0047434 A1    Mar. 11, 2004

(51) Int. Cl.
  *H04L 27/20* (2006.01)
(52) U.S. Cl. .................. 375/308; 375/238; 375/357; 375/340; 370/335; 370/282; 710/305; 710/306; 710/15
(58) Field of Classification Search .................. 375/308, 375/297, 340, 238, 295, 329, 357; 710/305, 710/306, 15; 455/69; 370/282, 335
See application file for complete search history.

(56) References Cited

U.S. PATENT DOCUMENTS

| | | | | |
|---|---|---|---|---|
| 5,925,110 A | * | 7/1999 | Klein | 710/15 |
| 6,094,428 A | * | 7/2000 | Bruckert et al. | 370/335 |
| 6,194,963 B1 | * | 2/2001 | Camp et al. | 330/149 |
| 6,226,333 B1 | * | 5/2001 | Spalink | 375/340 |
| 2003/0003875 A1 | * | 1/2003 | Oestreich | 455/69 |
| 2003/0147461 A1 | * | 8/2003 | Abrosimov et al. | 375/238 |
| 2003/0185308 A1 | * | 10/2003 | Schoenborn | 375/257 |
| 2003/0217215 A1 | * | 11/2003 | Taborek et al. | 710/305 |

* cited by examiner

*Primary Examiner*—Chieh M. Fan
*Assistant Examiner*—Eva Puente
(74) *Attorney, Agent, or Firm*—Blakely, Sokoloff, Taylor & Zafman LLP

(57) ABSTRACT

An apparatus and method for WGIO phase modulation are described. In one embodiment, the method includes the receipt of a high-speed data stream, encoded according to an 8b/10b code. Once received, a symbol rate of the data stream is reduced by a predetermined amount. Finally, once the symbol rate is reduced, a square wave carrier is phase modulated, using the reduced data rate data stream to generate a WGIO signal having double side band spectrum distributed either side of the square wave carrier. Accordingly, in one embodiment, a 3GIO signal may be phase modulated in order to fall within a spectrum that is not currently occupied by a wireless protocol, including, for example, Wireless Local Area Network (WLAN), Wireless Wide Area Networks (WWAN), global positioning systems (GPS), or the like in order to prevent interference therebetween.

21 Claims, 11 Drawing Sheets

ELECTRONIC SYSTEM 700

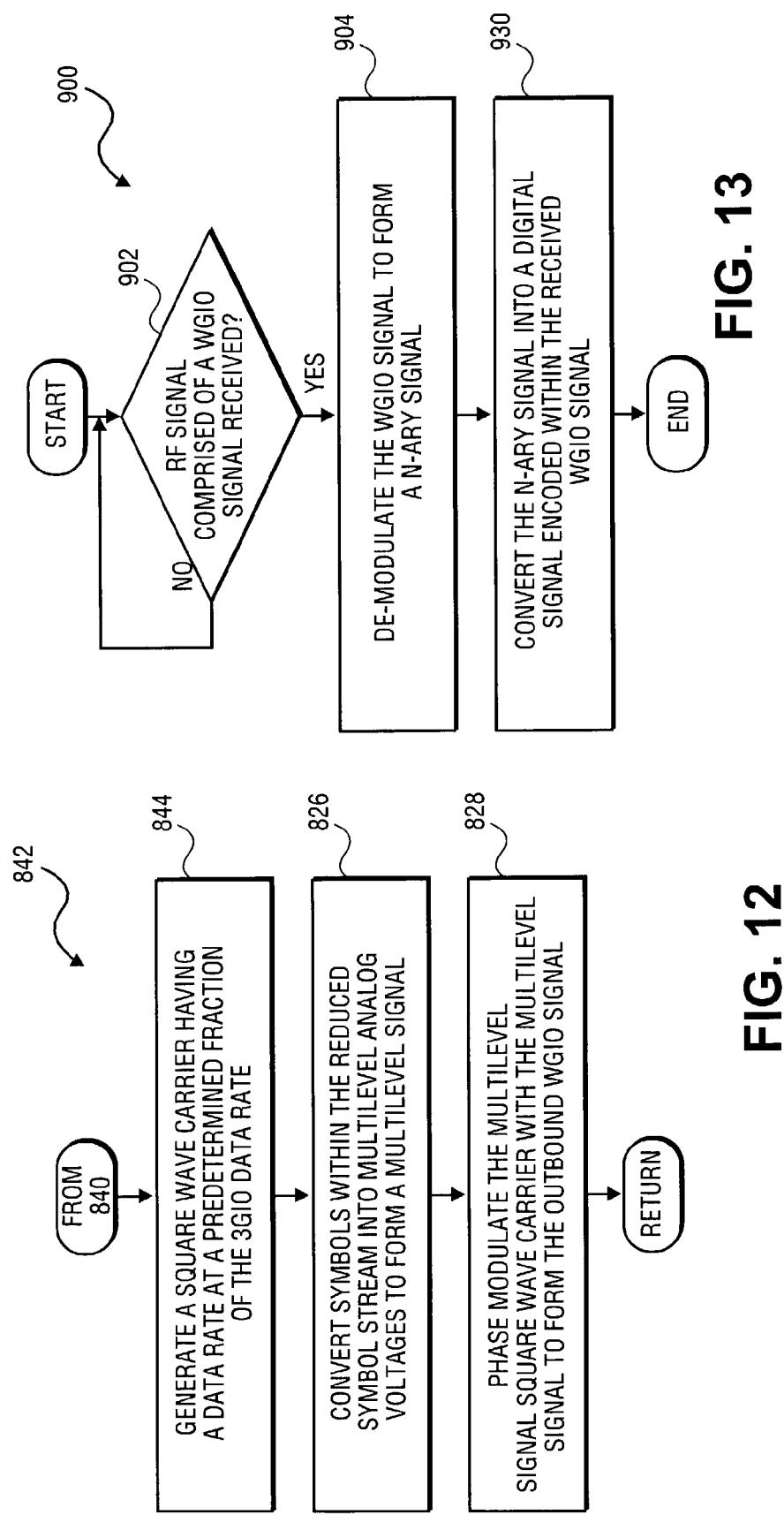

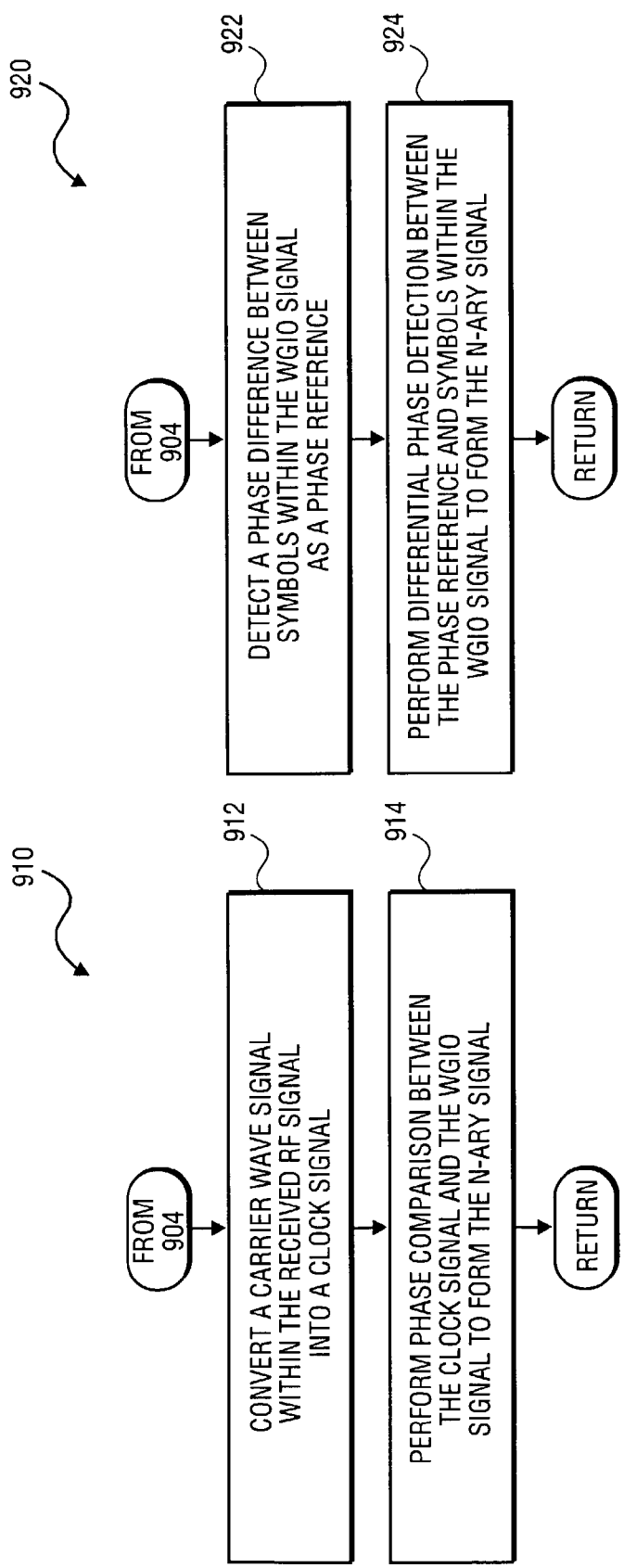

APPARATUS AND METHOD FOR WGIO PHASE MODULATION

FIELD OF THE INVENTION

One or more embodiments of the invention relate generally to the field of third generation digital data input/output (3GIO). More particularly, one or more of the embodiments of the invention relates to a method and apparatus for WGIO phase modulation.

BACKGROUND OF THE INVENTION

During the past decade, peripheral component interconnect (PCI) has provided a very successful general purpose input/output (I/O) interconnect standard. PCI is a general purpose I/O interconnect standard that utilizes PCI signaling technology, including a multi-drop, parallel bus implementation. Unfortunately, traditional multi-drop parallel bus technology is approaching its practical performance limits. In fact, the demands of emerging and future computing models will exceed the bandwidth and scalability limits that are inherent in multiple drop, parallel bus implementations.

Accordingly, it is clear that meeting future system performance needs requires I/O bandwidth that can scale with processing and application demands. Alongside these increasing performance demands, the enterprise server and communication markets require improved scalability, security and quality of service guarantees. Fortunately, technology advances and high speed point-to-point interconnects are enabling system designers to break away from the bandwidth limitations of multiple drop, parallel buses. To this end, system designers have discovered a high-performance, third generation I/O (3GIO) interconnect that will serve as a general purpose I/O interconnect for a wide variety of future computing and communications platforms.

3GIO comprehends the many I/O requirements presented across the spectrum of computing and communications platforms and rolls them into a common scalable and extensible I/O industry specification. One implementation of 3GIO includes a basic physical layer consisting of a differential transmit pair and a differential receiver pair. As such, dual simplex data on these point-to-point connections is self-clocked and its bandwidth increases linearly with interconnect width and frequency. In addition, a message space is provided within the bus protocol that is used to implement legacy side band signals. As a result, a further reduction of signal pins produces a very low pin count connection for components and adapters.

Along with the technological advances provided by 3GIO interconnects, many PC computers are now moving toward including wireless connectivity, such as wireless connectivity via, for example, wireless local area networks (WLAN), Bluetooth™ networks and even Internet access via the Wireless Worldwide Web (or WWAN). Unfortunately, including a 3GIO interconnect within a PC computer supporting wireless connectivity may lead to interference between the various wireless protocols and the 3GIO signal. Therefore, there remains a need to overcome one or more of the limitations in the above-described, existing art.

BRIEF DESCRIPTION OF THE DRAWINGS

The various embodiments of the present invention are illustrated by way of example, and not by way of limitation, in the figures of the accompanying drawings and in which:

FIG. 12 depicts a flowchart illustrating an additional method for phase modulating a received 3GIO signal, in accordance with the further embodiment of the present invention.

FIG. 13 depicts a flowchart illustrating a method for decoding a received WGIO signal, in accordance with the further embodiment of the present invention.

FIG. 14 depicts a flowchart illustrating an additional method for demodulating a received WGIO signal, in accordance with a further embodiment of the present invention.

FIG. 15 depicts a flowchart illustrating an additional method for demodulating a received WGIO signal, in accordance with an exemplary embodiment of the present invention.

DETAILED DESCRIPTION

Figure 1:
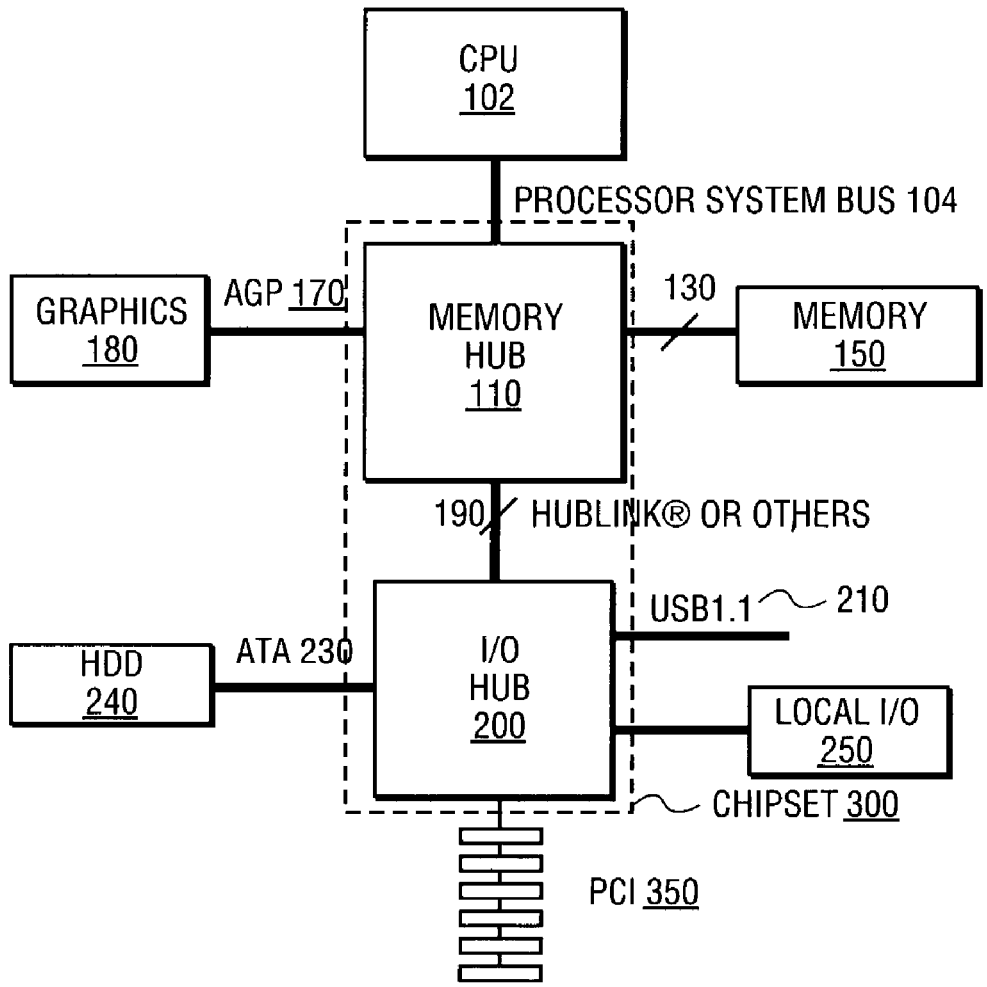
FIG. 1 depicts a block diagram illustrating a conventional client configuration utilizing a peripheral component interconnect (PCI) parallel multi-drop bus.

A method and apparatus for Wireless 3GIO (WGIO) WGIO phase modulation are described. In one embodiment, the method includes the receipt of a high-speed data stream, encoded according to an 8b/10b code. Once received, a symbol rate of the data stream is reduced by a predetermined amount by removing the 8b/10b coding and using groups of two or more data bits for form data symbols. Finally, once the symbol rate is reduced, a square wave carrier is phase modulated, using the reduced rate data symbol stream to generate a WGIO signal having double side band spectrum distributed either side of the square wave carrier. Accordingly, in one embodiment, a 3GIO signal may be phase modulated in order to fall within a spectrum that is not currently occupied by a wireless protocol, including, for example, Wireless Local Area Network (WLAN), Wireless Wide Area Networks (WWAN), global positioning systems (GPS), or the like in order to prevent interference therebetween.

In the following description, for the purposes of explanation, numerous specific details are set forth in order to provide a thorough understanding of the embodiments of the present invention. It will be apparent, however, to one skilled in the art that the various embodiments of the present invention may be practiced without some of these specific details. In addition, the following description provides examples, and the accompanying drawings show various examples for the purposes of illustration. However, these examples should not be construed in a limiting sense as they are merely intended to provide examples of the embodiments of the present invention rather than to provide an exhaustive list of all possible implementations of the embodiments of the present invention. In other instances, well-known structures and devices are shown in block diagram form in order to avoid obscuring the details of the various embodiments of the present invention.

Portions of the following detailed description may be presented in terms of algorithms and symbolic representations of operations on data bits. These algorithmic descriptions and representations are used by those skilled in the data processing arts to convey the substance of their work to others skilled in the art. An algorithm, as described herein, refers to a self-consistent sequence of acts leading to a desired result. The acts are those requiring physical manipulations of physical quantities. These quantities may take the form of electrical or magnetic signals capable of being stored, transferred, combined, compared, and otherwise manipulated. Moreover, principally for reasons of common usage, these signals are referred to as bits, values, elements, symbols, characters, terms, numbers, or the like.

However, these and similar terms are to be associated with the appropriate physical quantities and are merely convenient labels applied to these quantities. Unless specifically stated otherwise, it is appreciated that discussions utilizing terms such as "processing" or "computing" or "calculating" or "determining" or displaying" or the like, refer to the action and processes of a computer system, or similar electronic computing device, that manipulates and transforms data represented as physical (electronic) quantities within the computer system's devices into other data similarly represented as physical quantities within the computer system devices such as memories, registers or other such information storage, transmission, display devices, or the like.

The algorithms and displays presented herein are not inherently related to any particular computer or other apparatus. Various general purpose systems may be used with programs in accordance with the embodiments herein, or it may prove convenient to construct more specialized apparatus to perform the required method. For example, any of the methods according to the various embodiments of the present invention can be implemented in hard-wired circuitry, by programming a general-purpose processor, or by any combination of hardware and software.

One of skill in the art will immediately appreciate that the embodiments of the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The embodiments of the invention can also be practiced in distributed computing environments where tasks are performed by remote processing devices that are linked through a communications network. The required structure for a variety of these systems will appear from the description below.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression.

Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the embodiments of the present invention may be practiced as well as implemented as an embodiment).

In an embodiment, the methods of the various embodiments of the present invention are embodied in machine-executable instructions. The instructions can be used to cause a general-purpose or special-purpose processor that is programmed with the instructions to perform the methods of the embodiments of the present invention. Alternatively, the methods of the embodiments of the present invention might be performed by specific hardware components that contain hardwired logic for performing the methods, or by any combination of programmed computer components and custom hardware components.

In one embodiment, the present invention may be provided as a computer program product which may include a machine or computer-readable medium having stored thereon instructions which may be used to program a computer (or other electronic devices) to perform a process according to one embodiment of the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, one embodiment of the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

System Architecture

FIG. 1 depicts a block diagram illustrating a computer system 100, configured to utilize peripheral component interconnect (PCI) multiple drop buses. Computer system 100 comprises a processor system bus (front side bus) 104 for communicating information between a processor 102 and a memory hub 110, coupled together via the front side bus (FSB) 104. The computer system 100 also includes one or more temporary memory devices (memory) 150 coupled to memory hub 110 via memory bus 130. As described herein, memory 150 includes, but is not limited to, solid state memories, random access memories (RAM), synchronous RAM (SRAM), synchronous data RAM (SDRAM) or any device capable of supporting high speed buffering of data. In addition, the computer system may include one or more graphics devices 180 coupled to memory hub 110 via accelerated graphics port (AGP) 170.

Likewise, the computer system includes an input/output (I/O) subsystem comprised of I/O hub 200. As illustrated, the I/O hub 200 may be coupled, via an I/O bus 190, to memory hub 110. As illustrated, I/O hub 200 may be coupled to a universal serial bus (USB) 210, local I/O 250, as well as peripheral component interconnect devices (PCI) 350. Finally, the I/O hub 200 is also coupled to hard disk drive devices (HDD) 240 via an advanced technology attachment (ATA) bus 230.

As depicted in FIG. 1, the computer system 100 is shown in a client configuration. As illustrated, the PC platform computer system 100 supports a variety of application-specific buses alongside the PCI expansion bus 350, as illustrated in FIG. 1. Generally, the memory hub 110 and I/O hub 200 may form a system chipset 300, which communicates with the CPU 102. As illustrated in FIG. 1, the chipset 300 may be partitioned as a memory hub 110 and I/O hub 200, since the memory bus 130 often changes with each processor generation. Accordingly, one of the functions of the chipset 300 is to isolate the ever-changing memory buses 130 from the stable I/O bus 190.

Within computer systems, for example as depicted in FIG. 1, the processor system bus, or FSB 104, continues to scale in both frequency and voltage at a rate that will continue for the foreseeable future. Likewise, memory bandwidths have increased to keep pace with the processor, such as central processor (CPU) 102. Consequently, in order to keep pace with processor speed, as well as to provide frequency and voltage scaling, computer system 100 may be reconfigured as a 3GIO client configuration 400, for example, as depicted with reference to FIG. 2.

As illustrated with reference to FIG. 2, system 400 includes chipset 300, as depicted in FIG. 1, as well as memory 150, graphics 180, HDD 240 and local I/O 250. However, AGP port 170, I/O bus 190 and local I/O bus 260 are replaced with a 3GIO bus 500, which is further illustrated with reference to FIG. 3. In addition, a switch 410 is provided, which replaces the multi-drop bus and is used to provide fan out for the 3GIO bus 500.

Accordingly, utilizing the 3GIO interconnect 500, client configuration 400 no longer uses parallel, multi-drop buses and therefore is able to scale with both frequency and voltage, while avoiding strict skew requirements between parallel signals, as well as side band signals, required for streaming data. As such, the 3GIO interconnect provides a unifying I/O interconnect technology for desktop, mobile, server, communication, platforms, workstations and embedded systems. However, as indicated above, 3GIO, or PCI Express, has very stringent power management requirements, which cannot be met utilizing closed loop signaling due to the reduced latency requirements of PCI Express.

Figure 3:
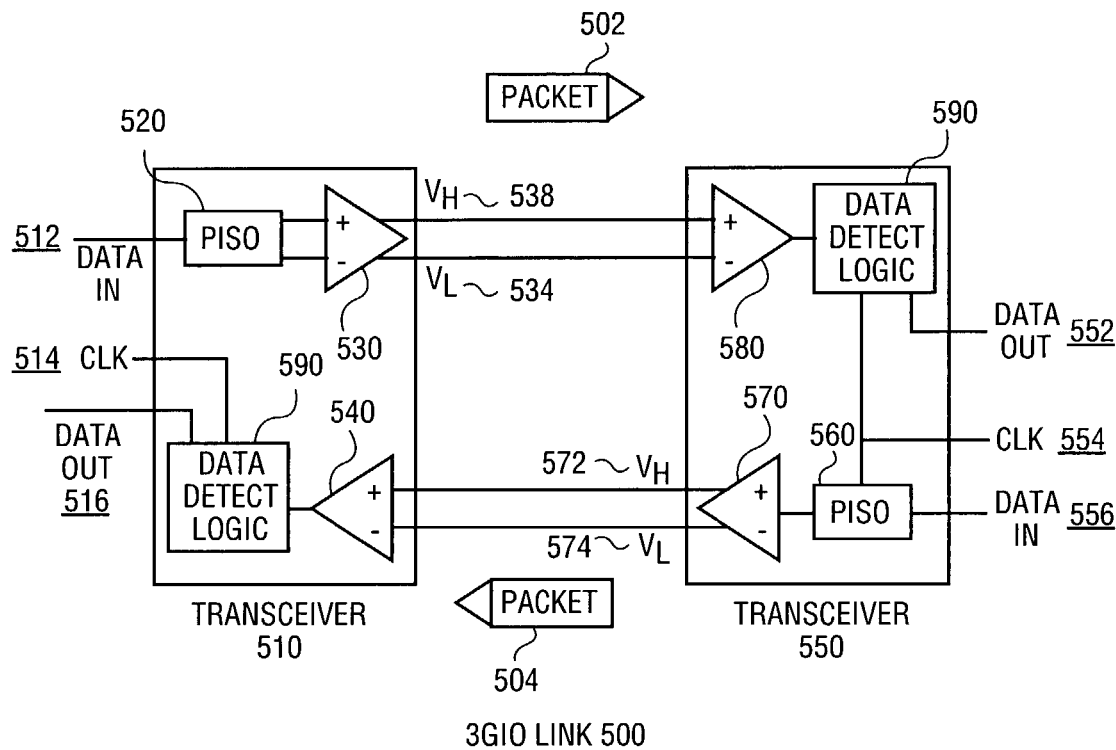
FIG. 3 depicts a block diagram illustrating a 3GIO link, in accordance with one embodiment of the present invention.

Referring now to FIG. 3, FIG. 3 depicts a 3GIO link 500 in accordance with one embodiment of the present invention. As depicted with reference to FIG. 3, the 3GIO link 500 represents a dual simplex communications channel between transceiver 510 and transceiver 550. The basic 3GIO link, as depicted in FIG. 3, includes two low voltage, differentially driven signal pairs, a transmit pair ($V_H$ 532 and $V_L$ 534) and a receive pair ($V_H$ 572 and $V_L$ 574). In addition, the 3GIO link 500 communicates via exchanged packets 502 and 504. As illustrated, link 500 includes dual unidifferential links comprised of a driver and receiver pair 530 and 540 of transceiver 510, as well as a receiver and driver pair 580 and 570 of transceiver 550. In addition, a data clock is embedded using an 8b/10b encoding scheme to achieve very high data rates.

The definition of the 8b/10b transmission code is identical to that specified in ANSI X3.230-1994, Clause 11 (and also IEEE 802.3Z, 36.2.4, July 1998). Using this scheme, 8 bit characters and one control bit are treated as 3 bits and 5 bits, mapped onto a 4 bit group code and a 6 bit group code, respectively. The control bit, in conjunction with the data characters is used to identify when to encode one of 12 special symbols included in the 8b/10b transmission (see Table 1). As such, these code groups are concatenated to form a 10 bit symbol, which is transmitted from a transmitter to a corresponding receiver via a dual differential link.

TABLE 1

| Encoding | Symbol | Name | Description |
|---|---|---|---|
| K28.5 | COM | Comma | Used for Lane and Link initialization and management |
| K27.7 | STP | Start TLP | Marks the start of a Transaction Layer Packet |
| K28.2 | SDP | Start DLLP | Marks the start of a Data Link Layer Packet |
| K29.7 | END | End | Marks the end of a Transaction Layer Packet or a Data Link Layer Packet |
| K30.7 | EDB | EnD Bad | Marks the end of a nullified TLP |
| K23.7 | PAD | Pad | Used in Framing and Link Width and Lane ordering negotiations |
| K28.0 | SKP | Skip | Used for compensating for different bit rates for two communicating ports |
| K28.1 | | | Reserved |
| K28.7 | | | Reserved |
| K28.3 | | | Reserved |
| K28.4 | | | Reserved |
| K28.6 | | | Reserved |
| K28.7 | | | Reserved |

8b/10b Control Characters

The 8b/10b code also provides a scheme which is DC balanced, indicating that the generated code stream, or bit stream, includes a balanced number of 1 and 0 bits. In addition, the code ensures a limited run length, such that no more than five consecutive ones, "1", or zeros, "0", and a guaranteed transition density which permits clock recovery from the data stream. In addition, the special (K) characters, as depicted with reference to Table 1, are useful as packet delimiters. Likewise, a subset of the special K characters, referred to as commas, are unique in that their bit pattern never occurs in a string of serialized data symbols, and hence, can be used to determine symbol boundaries at their receiving end.

Accordingly, the combination of these features allows the receiving end of an encoded 8b/10b data stream to extract the bit rate clock to determine symbol (and packet) boundaries and to detect most transmission errors. Likewise, 8b/10b codes include the concept of disparity, wherein the disparity of any block of data is defined as the difference between the number of ones and the number of zeros. As such, positive and negative refer to an excess of ones over zeros or zeros over ones, respectively. Consequently, the code scheme guarantees that an encoded symbol's disparity is always either zero (11111, 00000), plus two (111111, 0000) or −2 (1111, 000000), which is quite useful for error detection. A wireless 3GIO (WGIO) system, according to one embodiment of the present invention, is now described.

WGIO System

Figure 4:
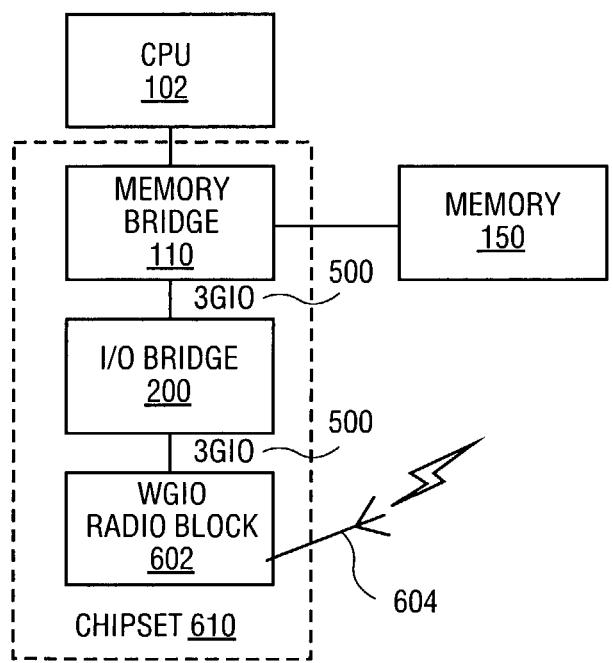
FIG. 4 depicts a block diagram illustrating a computer system implementing wireless 3GIO (WGIO) connectivity, in accordance with a further embodiment of the present invention.

Referring now to FIG. 4, FIG. 4 depicts a wireless 3GIO (WGIO) system 600 in accordance with a further embodiment of the present invention. As originally depicted with reference to FIG. 2, the 3GIO client configuration 400 may be modified in accordance with one embodiment of the present invention to utilize a WGIO radio block 602. Accordingly, the WGIO system 600 includes the CPU 102, memory bridge 110, memory 150 and I/O bridge 200 of the 3GIO client configuration 400, as depicted in FIG. 2.

However, the WGIO system 600 supports wireless connectivity to, for example, wireless local area networks (WLAN), Bluetooth™ area networks, as well as wireless Internet access via, for example, a wireless wide area network (WWAN), such as the Internet. Unfortunately, as depicted with reference to FIGS. 7 and 8, a wireless, or WGIO signal 672, generated from a sample data pattern 624, may conflict with the various wireless protocol, such as the WWAN (674 and 678), the global positioning system (GPS) 676, WLAN (680-684)) and the like.

Figure 5:
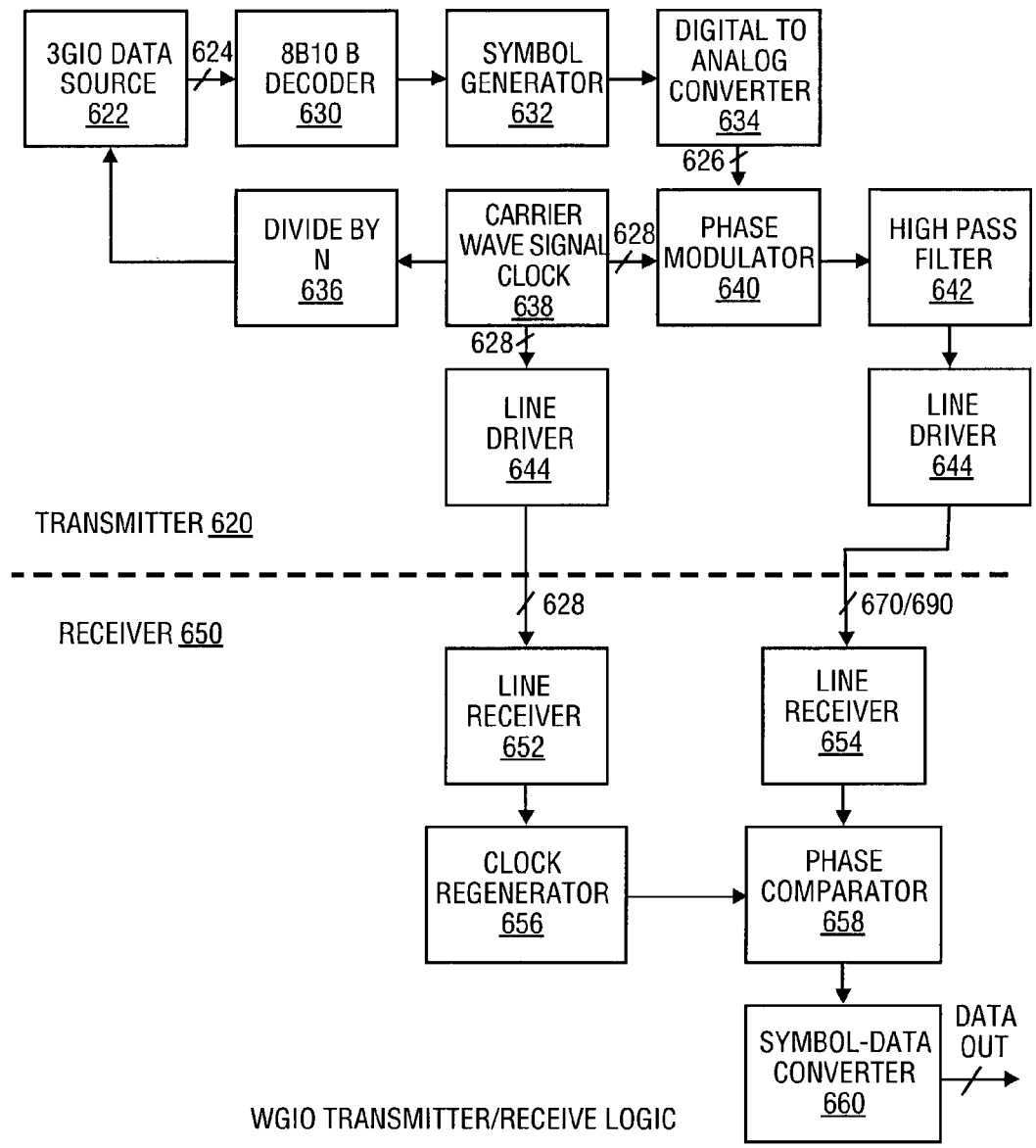
FIG. 5 depicts a block diagram illustrating a WGIO transmitter/receiver, in accordance with the further embodiment of the present invention.
Figure 6:
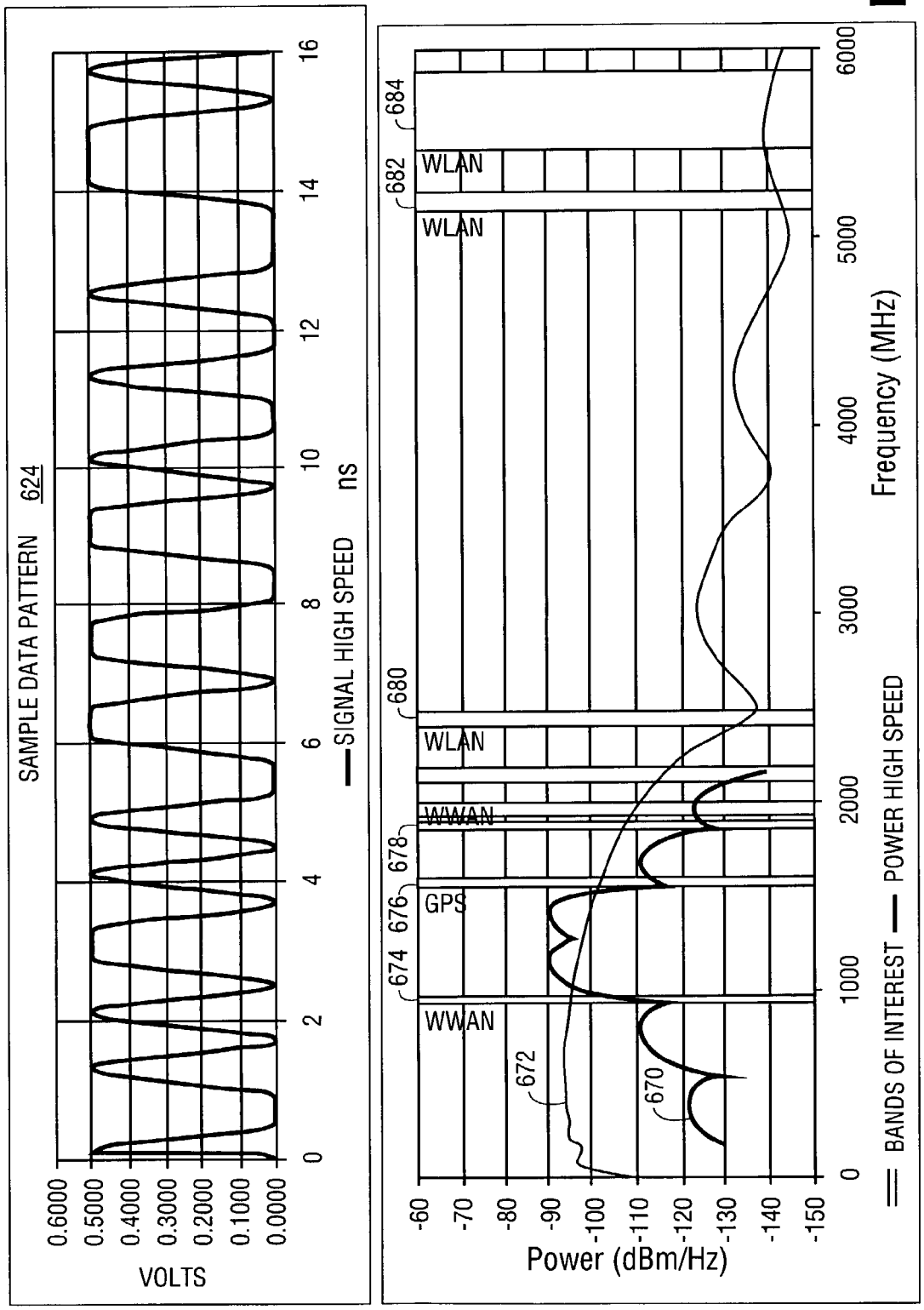
FIG. 6 depicts a block diagram illustrating phase modulation of a 3GIO signal, in accordance with the further embodiment of the present invention.
Figure 7:
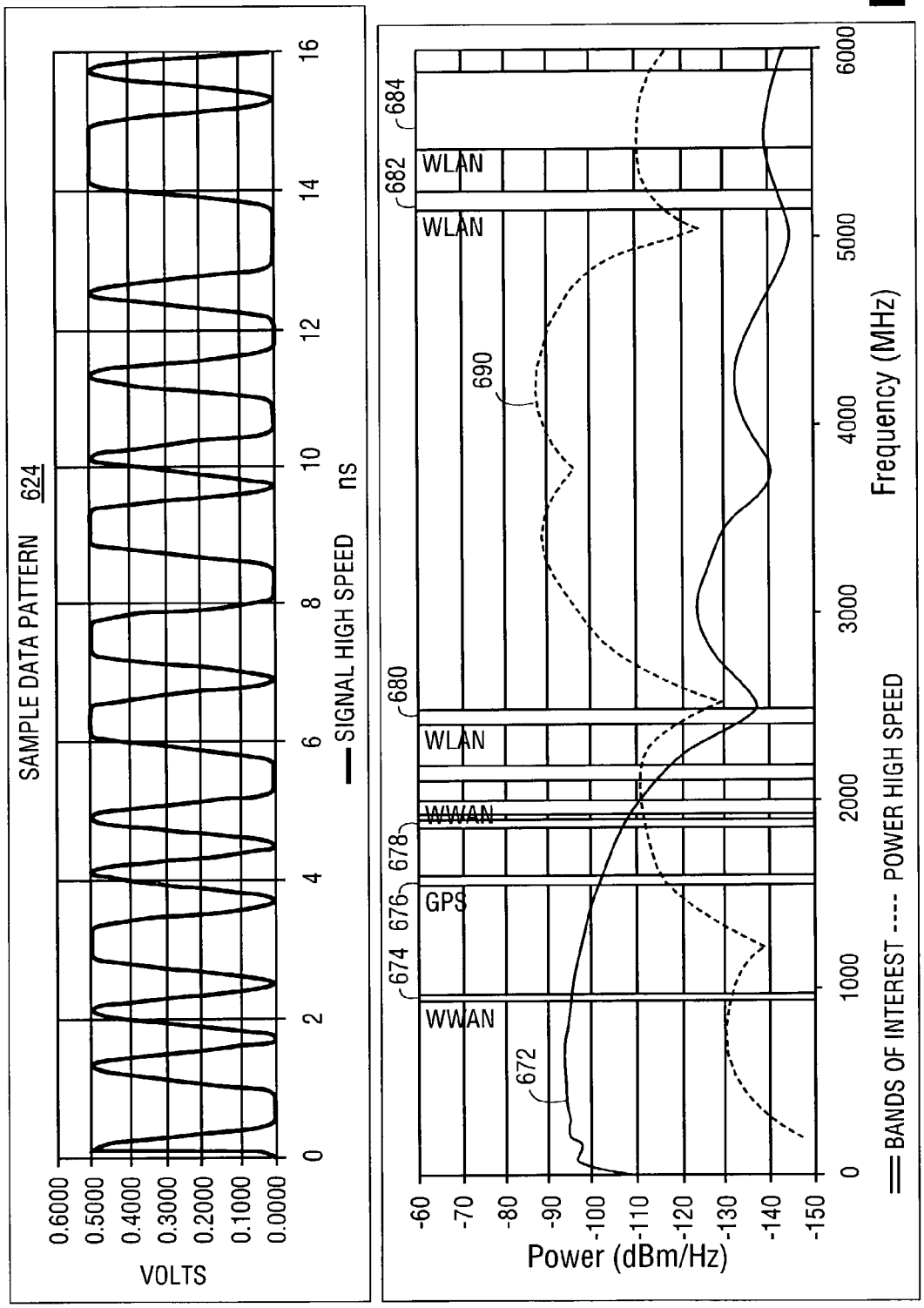
FIG. 7 depicts a graph illustrating modulation of a next generation 3GIO signal, in accordance with a further embodiment of the present invention.

Accordingly, one embodiment of the present invention phase modulates a received 3GIO, or next generation, signal above or surrounding a predetermined carrier wave signal in order to achieve a frequency spectrum, as depicted with reference to FIGS. 6 and 7. As illustrated, the generated frequency spectrum avoids interference with the various wireless protocols listed above. In one embodiment, the phase modulation is performed utilizing WGIO transmitter/receiver logic, for example, as depicted with reference to FIG. 5.

As illustrated with reference to FIG. 5, a transmitter 620 originally receives 3GIO data signal 624 from a 3GIO source 622. However, in accordance with one embodiment of the present invention, the 3GIO data is not clocked at the 2.5 gigabits per second (Gb/s) 3GIO data rate, but instead is clocked at a reduced data symbol rate, as illustrated by divide block 636, where the value N is determined based on the number of data bits combined to form each data symbol. For example, in accordance with one embodiment, as illustrated with reference to FIG. 6, the 3GIO signal, which exhibits a 2.5 Gb/s data rate is clocked at a WGIO symbol rate of 500 Mb/s. In doing so, a carrier wave signal 638, received from carrier wave signal clock 638, is utilized to generate the WGIO data symbol rate.

Accordingly, once encoded into symbols, the reduced rate data symbol stream 626 is used to phase modulate the square wave carrier 628, generating a signal 670/690 with a resulting spectrum that is a double-side band spectrum symmetrically distributed to either side of the carrier frequency 628, for example, as depicted with reference to FIG. 7. In one embodiment, the 3GIO rate signal 624 is decoded utilizing an 8b/10b decoder 630. Once decoded, symbol generator 632 and digital to analog converter block 634, translate the decoded reduced rate data stream to produce multilevel signal 626, which is fed to phase modulator 640. Consequently, phase modulator 640 phase modulates the carrier wave signal 628 received from carrier wave signal clock 630 according to the multilevel signal 628.

In one embodiment, for example, as depicted with reference to FIG. 5, the 3GIO data source 622 is clocked at a fraction of the 3GIO data rate, as determined by divide by N-block 636 to form a reduced rate data stream 624. Alternatively, the received 3GIO data stream is first decoded utilizing 8b/10b decoder 630. Once decoded, symbol generator 632 reforms the decoded binary data by combining one of two, three or four bits per symbol in order to form a reduced rate symbol stream. Once the reduced rate symbol stream is formed, the symbol stream may be clocked at a fraction of the 3GIO data rate to form the desired reduced rate data symbol stream.

Once the reduced rate symbol stream is formed, the reduced rate symbol stream may be provided to digital-to-analog converter 634, which generates a multilevel signal 626 according to a desired N-ary signal encoding. Accordingly, the received 3GIO data may alternatively be clocked at a reduced data rate while received or clocked once converted into a symbol stream, which is then converted into a multilevel signal 626. In the embodiment depicted, the multilevel signal 626 phase modulates the square wave carrier 628 in order to produce the desired WGIO signal 670/690.

In one embodiment, the carrier wave signal is a 1250 MHz signal, which is phase modulated using the multilevel signal stream 626 producing a double-side band signal distributed at either side of the carrier wave signal, as illustrated with reference to FIG. 6. In one embodiment, the generated signal may be passed to a high pass filter 642 in order to eliminate any baseband spectrum and any spectrum components below about 1 GHz, thus improving protection to cellular and Group Special Mobile (GSM) frequencies that are predominantly used for WWAN in North and South America. Likewise, in one embodiment, a band trap filter can also be used to improve protection in the 1700 to 2100 MHz band used elsewhere in the world.

Accordingly, the WGIO signal 670/690 produced by transmitter 620 is received by receiver 650, which according to one embodiment, first demodulates the received signal. In various embodiments, the demodulation can be performed utilizing, for example, a coherent phase comparator in which either a clock signal is used as a reference or by a differential phase detector in which the phase of a previous symbol can be used as the phase reference. In many applications, the differential mode is preferred as it will give a comparable error rate at small signal to noise ratios without the need to send a reference clock signal.

However, in various WGIO applications, phase jitter is likely to be a more serious limitation than signal to noise. Accordingly, it is up to the system design implementation to determine whether differential coherent mode is the most cost effective solution within a WGIO application. As such, in one embodiment, the output of phase comparator/detector 658 will be an N-level symbol that are read out into the original binary format. Consequently, the decoded signal from symbol data converter 660 may be utilized as desired while avoiding interference with various wireless protocols.

Referring again to FIG. 6, the resulting WGIO signal 670 contains NULL signals within the WWAN signal band 674, the GPS signal band 676, additional WWAN bands 678, WLAN band 680, as well as additional WLAN band 682 and 684. Consequently, the phase modulation will eliminate interference between WGIO signals utilized within wireless platforms, as well as the various wireless protocols utilized within cellular networks in the United States and South America, as well as Europe.

Referring now to FIG. 7, FIG. 7 depicts additional graph diagrams depicting phase modulation of a next generation I/O (NGIO), which in accordance with one embodiment of the present invention utilizes a high speed data rate of, for example, 5 Gb/s. In accordance with the embodiment depicted, a higher frequency carrier signal, for example, at 3.8 Gb/s, is utilized as the square wave carrier. As a result, using phase modulation, a reduced signal includes a desired spectrum bandwidth between 2.5 Gb/s and 5.1 Gb/s, thereby avoiding interference with the various wireless protocols, while supporting higher speed, next generation I/O.

As depicted with reference to FIG. 7, the resulting next generation I/O signal 690 utilizes a symbol rate of 1.3 Gb/s. Accordingly, utilizing Quaternary Phase Shift Keying (QPSK) for a four level phase modulation, the achieved data rate for next generation I/O would be approximately 5.2 Gb/s. Although the embodiments depicted with reference to FIGS. 6 and 7 use N-ary phase shift keying (PSK), those skilled in the art will recognize that various forms of phase modulation may be utilized as desired to provide the desired frequency spectrums.

Figure 8:
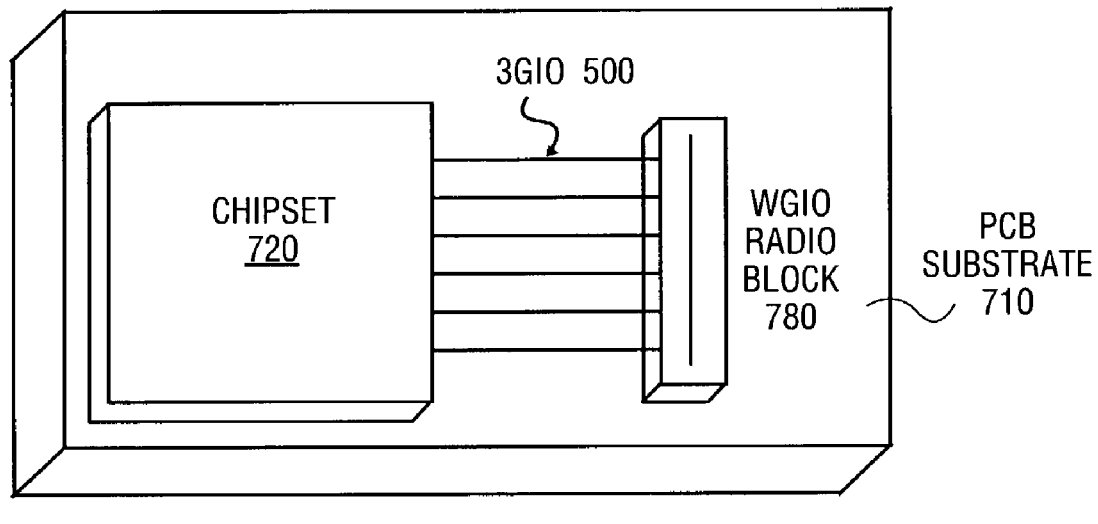
FIG. 8 depicts a block diagram illustrating an electronic system utilizing a WGIO radio block in order to provide WGIO connectivity, in accordance with an exemplary embodiment of the present invention.

Referring now to FIG. 8, FIG. 8 depicts a block diagram illustrating an electronic system 700, which utilizes a WGIO radio block 780 in conjunction with a 3GIO interconnect 500 between a chipset 720 and the WGIO radio block 780, such as, for example, WGIO radio block 602, as depicted with reference to FIG. 5. As illustrated, chipset 720 is installed onto printed circuit board (PCB) 710. In one embodiment, installation of chipset 720 may be done via one of a service on attachment, a through-hole attachment technique, or via a connector socket.

Figure 2:
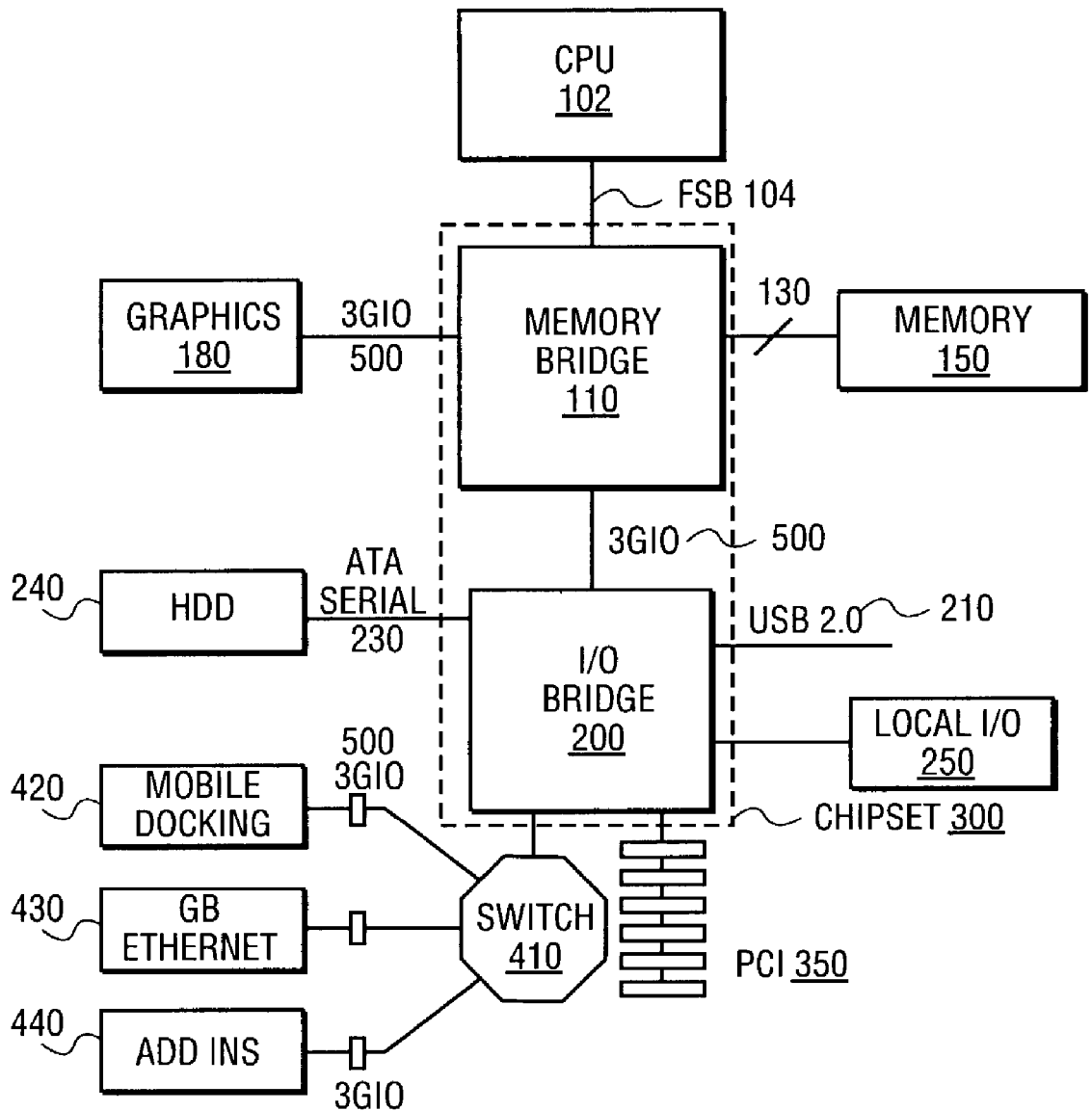
FIG. 2 depicts a block diagram illustrating a computer system utilizing 3GIO interconnects, in accordance with one embodiment of the present invention.

In one embodiment, the chipset may be configured as a memory controller hub or I/O controller hub, for example, as depicted with reference to FIGS. 2 and 5. Accordingly, electronic system 700 includes application within computer devices, such as PCs, supporting wireless connectivity, for example, as depicted with reference to FIG. 5. As illustrated, WGIO radio block 780 is also installed onto PCB 710 via, for example, a service mount or through-hole attachment technique or via connector socket. However, in contrast to conventional chipsets, chipset 720 communicates with WGIO radio block via a plurality of 3GIO interconnects 500, for example, high-speed buses. Consequently, WGIO radio block 780 may be utilized to communicate WGIO signals while avoiding interference with the various wireless protocols, as described above.

As depicted with reference to FIG. 8, electronic system 700 may also include a fabricated processor as well as an I/O hub, for example, as depicted with reference to FIGS. 2 and 5. In one embodiment, 3GIO interconnects are fabricated onto PCB 710. In a further embodiment, the WGIO radio block may be fabricated onto chipset 720. Procedural methods for implementing the embodiments of the present invention are now described.

Operation

Figure 9:
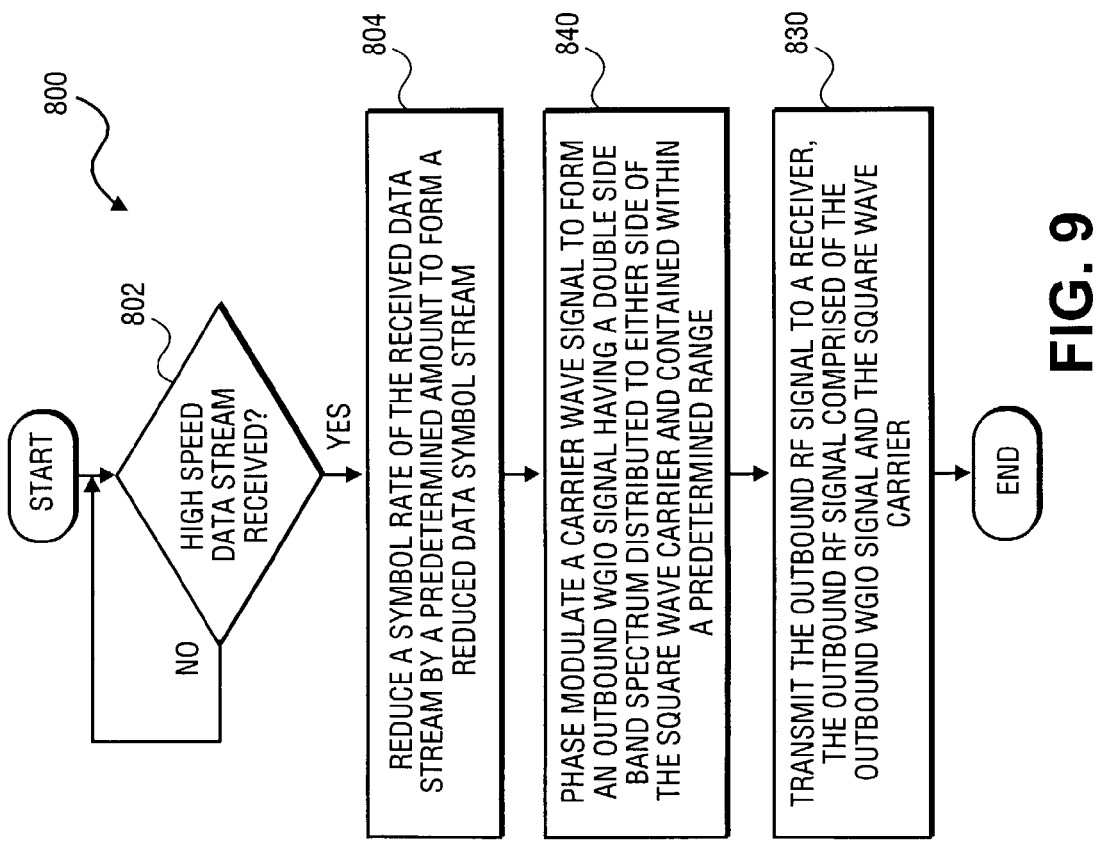
FIG. 9 depicts a flowchart illustrating a method for phase modulation of a 3GIO signal in order to form a WGIO signal, in accordance with one embodiment of the present invention.

Referring now to FIG. 9, FIG. 9 depicts a flowchart illustrating a method 800 for phase modulating a received 3GIO signal to generate a WGIO signal, in accordance with one embodiment of the present invention, for example, as depicted with reference to FIGS. 6 and 7, thereby avoiding interference between a generated WGIO signal and various wireless protocols utilized in North and South America, as well as Europe. Accordingly, at process block 802, it is determined whether a high-speed data stream, encoded according to, for example, a 8b/10b code, is received. Once received, process block 804 is performed.

At process block 804, a symbol rate of the received data stream is reduced by a predetermined amount to form a reduced rate data symbol stream. Next, at process block 820, a carrier wave signal having a predetermined frequency is phase modulated utilizing the reduced rate data symbol stream to form an outbound WGIO signal. For example, as illustrated with reference to FIG. 6, the outbound WGIO signal will exhibit a double-side band spectrum distributed to either side of the square wave carrier and contained within a predetermined range. For example, in one embodiment, the high-speed data stream is a 3GIO signal having a data rate of 2.5 Gb/s. Accordingly, the received high-speed data stream will exhibit an effective data rate of 2,000 megabits per second (mb/s).

In accordance with one embodiment, by clocking the symbols data at one-fourth of the effective data rate, a WGIO data rate of 500 m/s is achieved. Alternatively, for next generation 3GIO signals having a data rate including 8b/10b coding of 5 Gb/s, the effective data rate is 4,000 Mb per second. Accordingly, the amount of reduction required for a symbol rate of 1.3 Gs/s is reduced to one-third. Accordingly, once the desired WGIO signal is generated, at process block 830, the WGIO signal is transmitted to a receiver as an outbound RF signal comprised of the outbound WGIO signal and the square wave carrier, for example, as depicted with reference to FIG. 5.

Figure 10:
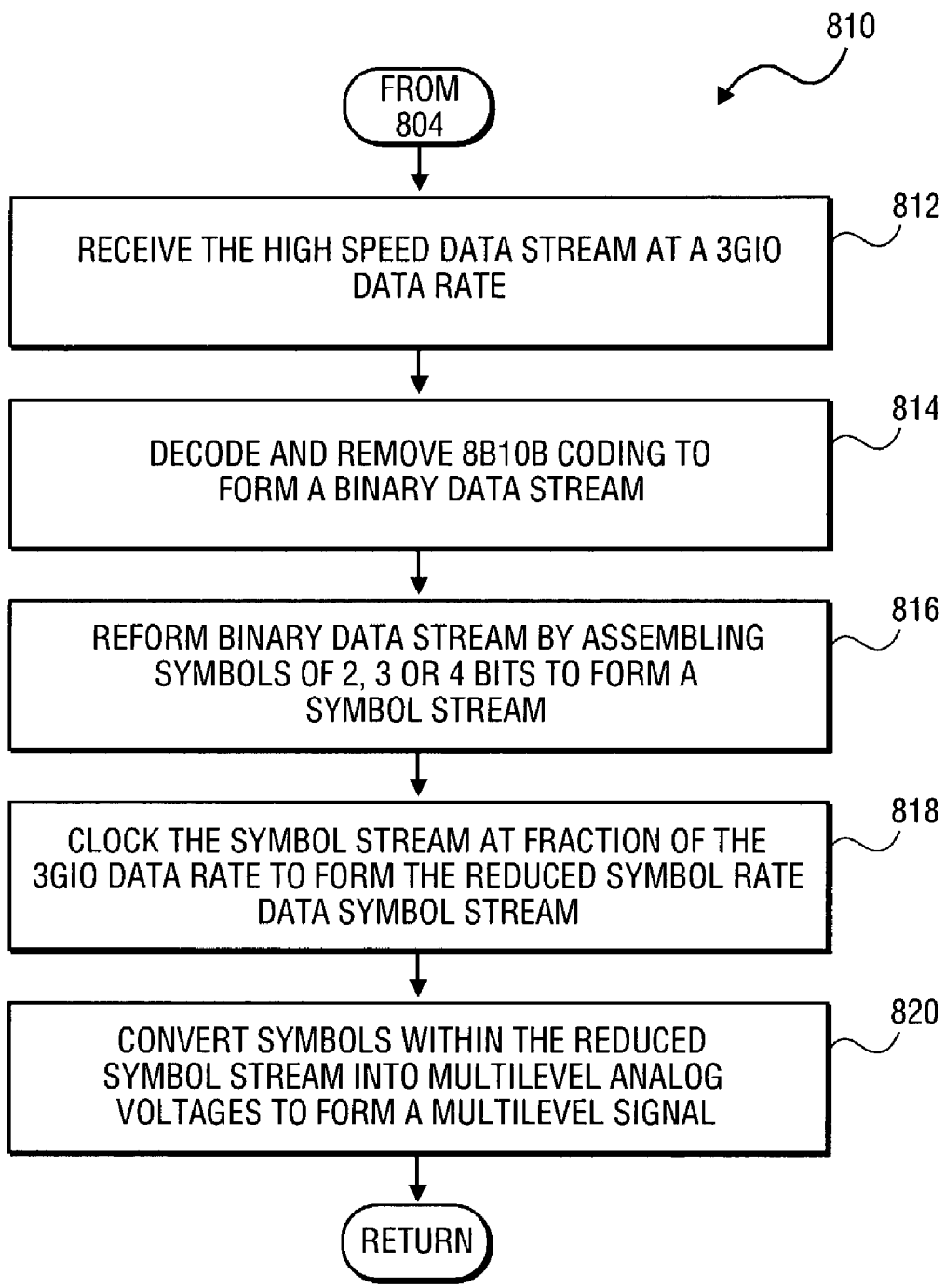
FIG. 10 depicts a flowchart illustrating an additional method for reducing a data rate of a received 3GIO signal, in accordance with the further embodiment of the present invention.

Referring now to FIG. 10, FIG. 10 depicts a flowchart illustrating an additional method 810 for reducing the symbol rate of process block 804, as depicted in FIG. 9. At process block 812, a high-speed data stream is received at a 3GIO data rate. Once received, at process block 814, the receive data stream is decoded utilizing 8b/10b decoding in order to remove any 8b/10b coding symbols, in order to form a binary data stream. Once the binary data stream is formed, at process block 816, the binary data stream is reformed by assembling symbols of, for example, two, three, four or a like number of bits in order to form a symbol stream.

Once symbol stream is formed, at process block 818, the symbol stream is clocked at a fraction of the 3GIO data rate to form a reduced rate symbol stream. In one embodiment, the fraction is, for example, one-fourth of the 3GIO data rate. Alternatively, for next generation 3GIO, the data rate is, for example, one-third of the data rate of the received data stream. Finally, at process block 820, symbols within the symbol stream are converted into multilevel analog voltages to form a multilevel signal, which can then be used in order to phase modulate the square wave carrier to generate the outbound WGIO signal.

Figure 11:
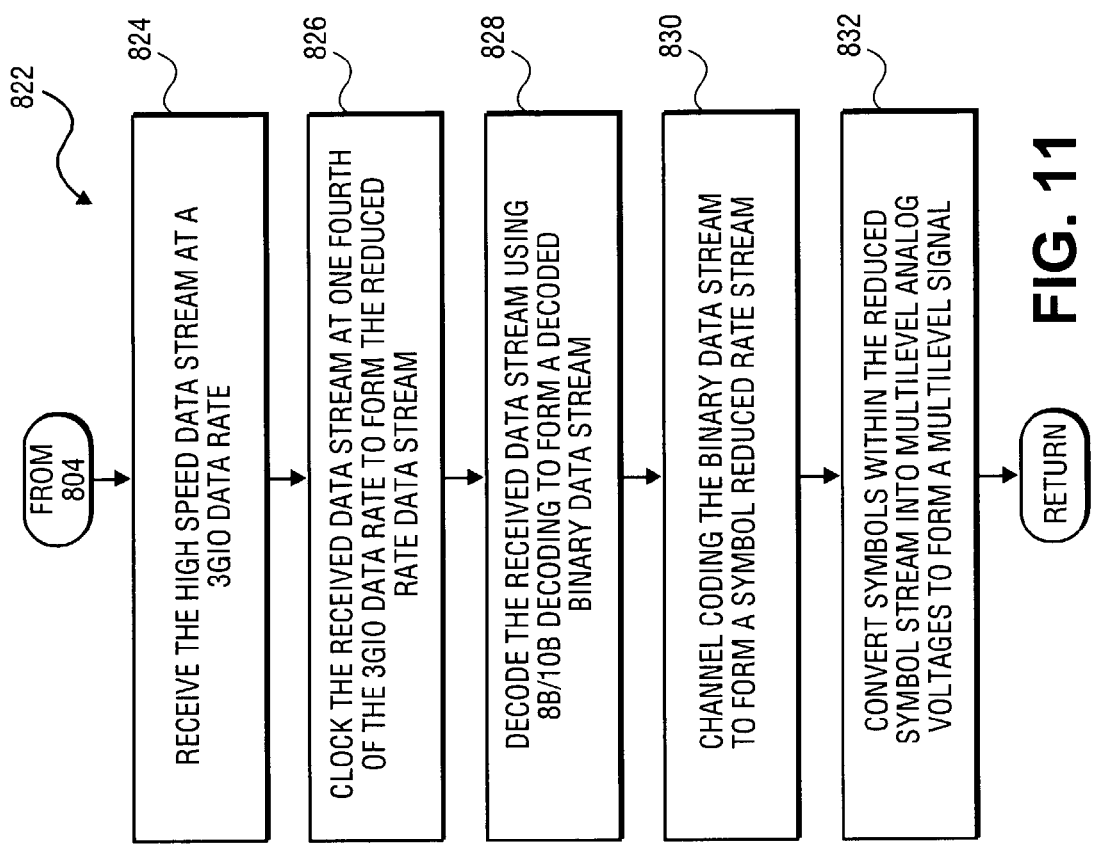
FIG. 11 depicts a flowchart illustrating an additional method for reducing a data rate of a received 3GIO signal, in accordance with the further embodiment of the present invention.

Referring now to FIG. 11, FIG. 11 depicts a flowchart illustrating an additional method 822 for reducing the sum or rate of process block 804, as depicted in FIG. 9. At process block 824, the high-speed data stream is received at a 3GIO data rate. Once received, at process block 826, the received data stream is clocked at one-fourth of the 3GIO data rate to form the reduced data stream. However, in an alternate embodiment, the received high-speed data stream may be a next generation 3GIO data rate of approximately 5 Gb/s as compared to the 2.5 Gb/s data rate of 3GIO signals. Accordingly, the clocking would be performed at approximately one-third of the 3GIO data rate to form the reduced rate data symbol stream, thereby enabling generation of a next generation 3GIO signal within the frequency spectrum, as depicted with reference to FIG. 7.

Next, at process block 828, the reduced rate data stream is decoded using 8b/10b decoding to form a decoded binary data stream. Once decoded, at process block 826, channel coding of the binary data stream is performed in order to form a reduced rate symbol stream. Finally, at process block 832, the reduced rate symbol stream is converted, such that symbols within the stream are converted into multilevel analog voltages to form a multilevel signal, which is utilized to phase modulate the carrier wave signal in order to generate the WGIO signal having a desired frequency spectrum.

Referring now to FIG. 12, FIG. 12 depicts a flowchart illustrating an additional method 842 for phase modulating the reduced rate data symbol stream of process block 840, as depicted in FIG. 9. At process block 844, the square wave carrier is generated, having a data rate at a predetermined fraction of the 3GIO data rate, such as, for example, one-half (½). Once generated, at process block 846, a multilevel signal is generated from the reduced rate data symbol stream. Finally, at process block 848, the square wave carrier is phase modulated according to the multilevel data stream signal to form the outbound WGIO signal. Accordingly, in alternate embodiments, the square wave carrier is approximately one-half the next generation 3GIO signal rate of 5 Gb/s yielding a 3.8 gigahertz (GHz) square wave carrier, for example, as depicted with reference to FIG. 7.

In various embodiments, the outbound WGIO signal may be high pass filtered to eliminate any baseband spectrum. In addition, in one embodiment, the channel encoding is performed utilizing a unity rate differential mode encoding in order to restore a DC balance of the channel encoded data, which is provided as one of the benefits of utilizing an 8b/10b code. Likewise, the binary data stream may be encoded utilizing quaternary phase shift keying (QPSK) utilizing a 4-ary signaling an 8-ary signaling or the like as provided by the various data rates.

Furthermore, as illustrated with reference to FIGS. 6 and 7, the spectrum of the WGIO outbound signal is contained within one of a 940 megahertz (MHz) to 1,540 MHz band and a 2,500 MHz to 5,100 MHz band. In addition, the WGIO data rates are generally within the range of 500 megabits per second (mb/s) and 1.3 Gb/s and the square wave carrier wave is generally one of 1,200 MHz signal and a 3,800 MHz signal.

Referring now to FIG. 13, FIG. 13 depicts a flowchart illustrating a method 900 for processing a received WGIO signal in accordance with the further embodiment of the present invention. Accordingly, at process block 902, it is determined whether an RF signal comprised of a WGIO signal is received. Once received, at process block 904, the WGIO signal is demodulated to form N-ary signal. Once formed, at process block 930, the N-ary signal is converted into a digital signal contained within the received WGIO signal. In one embodiment, this is performed as depicted with reference to transmitter/receiver logic, as illustrated with reference to FIG. 5.

Referring now to FIG. 14, FIG. 14 depicts a flowchart illustrating an additional method 910 for performing demodulation of a received WGIO signal, in accordance with a further embodiment of the present invention. At process block 912, a received carrier wave signal within the RF signal is converted into a clock signal. Once converted, at process block 914, phase comparison between the clock signal and the WGIO signal, is performed to form the N-ary signal. Accordingly, as depicted with reference to FIG. 13, the illustrated embodiment achieves phase demodulation of the received WGIO signal utilizing a coherent phase comparator.

Alternatively, as depicted with reference to FIG. 15, phase demodulation may be performed utilizing a differential phase detector. Accordingly, as depicted with reference to FIG. 15, FIG. 15 depicts a flowchart illustrating an additional method 920 for performing demodulation of process block 904, as depicted with reference to FIG. 9, in accordance with a further embodiment of the present invention. At process block 922, a phase difference between symbols within the WGIO signal is detected as a phase reference. Once the phase reference is detected, differential phase detection is performed between the phase reference and the symbols within the WGIO signal to form the N-ary signal at process block 924. As such, the N-ary signal can be processed as desired, if and when desired, converted and re-encoded into the 8b/10b code to produce a 3GIO, or next generation 3GIO signal.

Accordingly, in accordance with one embodiment of the present invention, a wireless 3GIO, or WGIO, signal is described, which may be utilized within PC computers to provide wireless connectivity to various wireless networks, such as, WLANs, Bluetooth™ networks and wireless Internet connectivity. As such, the generated WGIO signal will not exhibit interference with various wireless protocols utilized within North America, South America or Europe, including, for example, southern GSM frequencies used for WWAN in North and South America, as well as WLAN and Bluetooth™ protocols.

Consequently, the high-speed connectivity provided by 3GIO can be further applied within PC computers, such as, notebook computers, which include wireless cards. Accordingly, in one embodiment, the application of phase modulation on short copper buses for purposes of interference protection to radio devices in close proximity is provided. As described above, the baseband frequency of the data is utilized as a small divisor of a carrier frequency to generate a WGIO signal with the desired double-side band spectrum symmetrically distributed to either side of the carrier frequency.

Alternate Embodiments

Several aspects of one implementation of the WGIO system for providing WGIO signals have been described. However, various implementations of the WGIO system provide numerous features including, complementing, supplementing, and/or replacing the features described above. Features can be implemented as part of the I/O hub or as part of the WGIO card in different embodiment implementations. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

In addition, although an embodiment described herein is directed to a WGIO, it will be appreciated by those skilled in the art that the embodiments of the present invention can be applied to other systems. In fact, systems for wireless PC connectivity fall within the embodiments of the present invention, as defined by the appended claims. The embodiments described above were chosen and described in order to best explain the principles of the embodiments of the invention and its practical applications. These embodiments were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the embodiments of the present invention to the full extent indicated by the broad general meaning of the terms in which the appended claims are expressed.

The embodiments of the present invention provides many advantages over known techniques. In one embodiment, the present invention includes the ability to utilize a 3GIO interconnect, high speed bus in close proximity to WWAN and WLAN devices with a minimum of interference. As such, high speed data buses may be implemented within mobile platforms without providing or avoiding interference with various wireless specifications. Accordingly, a baseband frequency of data is provided as a small devisor of the carrier frequency in order to generate a resulting data spectrum which falls within a predetermined range, which does not interfere with wireless specifications.

Having disclosed exemplary embodiments and the best mode, modifications and variations may be made to the disclosed embodiments while remaining within the scope of the embodiments of the invention as defined by the following claims.

What is claimed is:

1. A method comprising:
   receiving a high speed data stream;
   reducing a symbol rate of the received data stream by a predetermined amount to form a reduced rate data stream having a data symbol encoding that is different from a data symbol encoding of the received high speed data stream;
   generating a square wave carrier as the carrier wave signal having a data rate at a predetermined fraction of a third-generation (3G) input/output (I/O) (3GIO) data rate;
   converting the reduced rate data stream into a multilevel analog voltage signal;
   phase modulating the square carrier wave signal using the analog voltage signal to form an outbound (W) wireless third-generation (3G) input/output (I/O) 3GIO (WGIO) signal having a double side band spectrum distributed to either side of the carrier wave signal, contained within a predetermined range, and having a predetermined, reduced symbol rate; and
   transmitting an outbound radio frequency (RF) signal to a receiver, the outbound RF signal comprised of the outbound WGIO signal and the carrier wave signal.

2. The method of claim 1, wherein reducing the symbol rate further comprises:
   receiving the high speed data stream, encoded according to an 8b/10b code, at a 3GIO data rate;
   decoding the received data stream using 8b/10b decoding to form a decoded binary data stream;
   reforming the binary data stream to form a data symbol stream; and
   clocking the data symbol stream at a fraction of the 3GIO data rate to form the reduced rate data stream.

3. The method of claim 1, wherein reducing the symbol rate further comprises:
   receiving the high speed data stream, encoded according to an 8b/10b code, at a 3GIO data rate;
   clocking the received data stream at one-fourth of the 3GIO data rate to form the reduced rate data stream;
   decoding the reduced rate stream using 8b/10b decoding to form a decoded binary data stream; and
   reforming the binary data stream to form a reduced symbol rate data symbol stream as the reduced rate data stream.

4. The method of claim 3, wherein the binary data stream is reformed utilizing a unity rate differential mode encoding to restore a DC balance of the data symbol stream.

5. The method of claim 3, wherein the symbol stream is encoded according to one of a 4-ary signaling and an 8-ary signaling using phase shift keying (PSK).

6. The method of claim 1, wherein a spectrum of the outbound signal is contained within one of a 940 MHz to 1,540 MHz band and 2,500 MHz to 5,100 MHz band.

7. The method of claim 1, wherein the received data stream is reduced by the predetermined amount of to achieve a WGIO data rate within the range of 500 Mb/s and 1.3 Gb/s; and
   wherein the square wave carrier is one of a 1,250 MHz signal and a 3,800 MHz signal.

8. The method of claim 1:
   wherein 3GIO data rate is one of 2.5 Gb/s and 5 Gb/s; and
   wherein the predetermined amount is within the range of two-thirds (⅔) and three-fourths (¾).

9. A method comprising:
   receiving a radio frequency (RF) signal comprised of a wireless (W) third-generation (3G) input/output (I/O) (3GIO) (WGIO) signal;
   de-modulating the WGIO signal by converting the carrier wave signal within the received RF signal into the clock signal and performing phase comparison between the clock signal and the WGIO signal to form an N-ary signal; and
   converting the N-ary signal into a digital signal encoded within the received WGIO signal.

10. A method comprising:
    receiving a radio frequency (RF) signal comprised of a wireless (W) third-generation (3G) input/output (I/O) (3GIO) (WGIO) signal;
    de-modulating the WGIO signal by detecting a phase difference between symbols within the WGIO signal as a phase reference and performing differential phase detection between the phase reference and symbols within the WGIO signal to form an N-ary signal; and
    converting the N-ary signal into a digital signal encoded within the received WGIO signal.

11. The method of claim 9, further comprising:
    encoding the digital signal according to an 8b/10b code.

12. The method of claim 9, wherein the received RF signal is contained within one of a 940 MHz to 1,540 MHz band and a 2,500 MHz to 5,100 MHz band.

13. A computer readable storage medium including program instructions that direct a computer to perform one or more operations when executed by a processor, the one or more operations comprising:
    receiving a high speed data stream, encoded according to an 8b/10b code, at a third-generation (3G) input/output (I/O) (3GIO) data rate;
    decoding the received data stream using 8b/10b decoding to form a decoded binary data stream;
    reforming the binary data stream to form a data symbol stream;
    clocking the data symbol stream at a fraction of the 3GIO data rate to reduce a symbol rate of the received data stream by a predetermined amount to form a reduced rate data stream having a data symbol encoding that is different from a data symbol encoding of the received high speed data stream;
    phase modulating a carrier wave signal having a predetermined frequency using the reduced rate data stream to form an outbound wireless (W) 3GIO (WGIO) signal having a double side band spectrum distributed to either side of the carrier wave signal and contained within a predetermined range and
    transmitting an outbound radio frequency (RF) signal to a receiver, the outbound RF signal comprised of the outbound WGIO signal and the carrier wave signal.

14. A computer readable storage medium including program instructions that direct a computer to perform one or more operations when executed by a processor, the one or more operations comprising:
    receiving a high speed data stream, encoded according to an 8b/10b code, at a third-generation (3G) input/output (I/O) (3GIO) data rate;

clocking the received data stream at one-fourth of the 3GIO data rate to form a reduced rate data stream having a data symbol encoding that is different from a data symbol encoding of the received high speed data stream;

decoding the reduced rate data stream using 8b/10b decoding to form a decoded binary data stream;

reforming the binary data stream to form a reduced symbol rate data symbol stream;

phase modulating a carrier wave signal having a predetermined frequency using the reduced rate data stream to from an outbound wireless (W) 3GIO (WGIO) signal having a double side band spectrum distributed to either side of the carrier wave signal and contained within a predetermined range; and transmitting an outbound radio frequency (RF) signal to a receiver, the outbound RF signal comprised of the outbound WGIO signal and the carrier wave signal.

15. The computer readable storage medium of claim 13, wherein phase modulating further comprises:

generating a square wave carrier as the carrier wave signal having a data rate at a predetermined fraction of the 3GIO data rate;

converting the reduced rate data stream into a multilevel analog voltage signal; and phase modulating the square wave carrier using the analog voltage signal to form the outbound WGIO signal having a predetermined, reduced symbol rate.

16. A computer readable storage medium including program instructions that direct a computer to perform one or more operations when executed by a processor, the one or more operations comprising:

receiving a radio frequency (RF) signal comprised of a wireless (W) third-generation (3G) input/output (I/O) (3GIO) (WGIO) signal;

de-modulating the WGIO signal by converting a carrier wave signal within the received RF signal into a clock signal and performing phase comparison between the clock signal and the WGIO signal to form an N-ary signal; and converting the N-ary signal into a digital signal encoded within the received WGIO signal.

17. A computer readable storage medium including program instructions that direct a computer to perform one or more operations when executed by a processor, the one or more operations comprising:

receiving a radio frequency (RF) signal comprised of a wireless (W) third-generation (3G) input/output (I/O) (3GIO) (WGIO) signal;

de-modulating the WGIO signal by detecting a phase difference between symbols within the WGIO signal as a phase reference and performing difference phase detection between the phase reference and symbols within the WGIO signal to form an N-ary signal; and converting the N-ary signal into a digital signal encoded within the received WGIO signal.

18. A system comprising:

a transmitter including:

a communications interface to receive a third-generation (3G) input/output (I/O) (3GIO) signal, the communication interface including a phase modulator to phase modulate a carrier wave signal according to a reduced data rate signal generated from the received 3GIO signal to generate a phase modulated wireless (W) 3GIO (WGIO) outbound signal contained within a predetermined frequency range;

a receiver including:

a communications interference to receive a radio frequency (RF) signal including the WGO signal to perform phase modulation of the WGIO signal to form the 3GIO signal contained within the received RF signal;

a phase comparator to demodulate the received WGIO signal by comparing a clock signal converted from the carrier wave signal with the WGIO signal to form an N-ary signal; and a symbol converter to convert symbols within the N-ary signal to form the digital data encoded within the WGIO signal.

19. The system of claim 18, wherein transmitter further comprises:

a data buffer to clock the received 3GIO data signal at a reduced data rate to form a reduced data rate signal;

an 8b/10b decoder to decode the reduced rate data signal into digital data; and a symbol encoder to encode the digital data according to a channel code to enable RF transmission.

20. The system of claim 18, further comprising:

a clock regeneration to receive the carrier wave signal within the received RF signal and generate a reference clock which is provided to the phase comparator to perform demodulation using coherent phase comparison according to the reference clock.

21. A system comprising:

a transmitter including:

a communications interface to receive a third-generation (3G) input/output (I/O) (3GIO) signal, the communication interface including a phase modulator to phase modulate a carrier wave signal according to a reduced data rate signal generated from the received 3GIO signal to generate a phase modulated wireless (W) 3GIO (WGIO) outbound signal contained within a predetermined frequency range;

a receiver including:

a communications interference to receive a radio frequency (RF) signal including the WGO signal to perform phase modulation of the WGIO signal to form the 3GIO signal contained within the received RF signal;

a differential phase detector to demodulate the received WGIO signal by performing differential phase detection between a phase reference and symbols within the WGIO signal to form an N-ary signal, wherein the phase reference is a phase difference between symbols within the WGIO signal; and a symbol converter to convert symbols within the N-ary signal to form the digital data encoded within the WGIO signal.

* * * * *